(12) United States Patent
Cho et al.

(10) Patent No.: US 11,715,178 B2
(45) Date of Patent: Aug. 1, 2023

(54) METHOD AND APPARATUS FOR GENERATING IMAGE

(71) Applicant: SAMSUNG ELECTRONICS CO., LTD., Suwon-si (KR)

(72) Inventors: Sungkwang Cho, Seoul (KR); Dongkyung Nam, Yongin-si (KR); Byungin Yoo, Seoul (KR); Yangho Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 305 days.

(21) Appl. No.: 17/201,707

(22) Filed: Mar. 15, 2021

(65) Prior Publication Data

US 2022/0058769 A1    Feb. 24, 2022

(30) Foreign Application Priority Data

Aug. 24, 2020 (KR) .................. 10-2020-0106576

(51) Int. Cl.
*G06T 3/40* (2006.01)
*G06T 3/00* (2006.01)
(Continued)

(52) U.S. Cl.
CPC ............ *G06T 3/4038* (2013.01); *G06N 3/04* (2013.01); *G06T 3/0093* (2013.01); *G06T 5/009* (2013.01);
(Continued)

(58) Field of Classification Search
CPC ..... G06T 3/4038; G06T 3/0093; G06T 5/009; G06T 2207/20021; G06T 2207/20084;
(Continued)

(56) References Cited

U.S. PATENT DOCUMENTS 8,351,686 B2 *  1/2013  Graesser ............... G01C 15/06
                                                    382/106
10,578,948 B2    3/2020  Shabtay et al.
(Continued)

FOREIGN PATENT DOCUMENTS

DE    102019208216 A1 * 12/2020  ............. G06T 7/246
DE    112021000208 T5 *  9/2022  ......... H04N 5/23254
(Continued)

OTHER PUBLICATIONS

Athindran Ramesh Kumar et al., "Pack and Detect: Object Detection in Videos Using Region-of-Interest Packing", Jan. 26, 2019, pp. 1-14 (14 pages total).
(Continued)

*Primary Examiner* — Charles T Shedrick
(74) *Attorney, Agent, or Firm* — Sughrue Mion, PLLC

(57) ABSTRACT

Disclosed is a method and apparatus for generating an image. The apparatus includes at least one processor and a memory. The processor is configured to obtain a wide image of an entire region, obtain one or more teleimages of one or more regions of interest (ROIs) of the entire region using a telecamera according to a capturing order of the telecamera determined for the one or more ROIs based on the wide image, match the wide image and the one or more teleimages, warp the one or more teleimages to the wide image based on a result of the matching, and stitch the one or more warped teleimages based on the wide image.

20 Claims, 8 Drawing Sheets

(51) Int. Cl.
*G06N 3/04* (2023.01)
*G06T 5/00* (2006.01)
*H04N 23/698* (2023.01)
*H04N 23/951* (2023.01)

(52) U.S. Cl.
CPC ......... *H04N 23/698* (2023.01); *H04N 23/951* (2023.01)

(58) Field of Classification Search
CPC . G06T 2207/20164; G06T 2207/20221; G06T 3/0018; G06T 5/005; G06T 5/50; G06T 3/40; G06N 3/04; G06N 3/08; H04N 23/698; H04N 23/951; H04N 23/10; H04N 23/667; H04N 23/90; H04N 5/265
See application file for complete search history.

(56) References Cited

U.S. PATENT DOCUMENTS

| | | | |
|---|---|---|---|
| 2005/0185047 A1* | 8/2005 | Hii ...................... | H04N 23/698 348/E5.051 |
| 2007/0081081 A1 | 4/2007 | Cheng | |
| 2010/0194851 A1 | 8/2010 | Pasupaleti et al. | |
| 2014/0126768 A1 | 5/2014 | Ramachandran et al. | |
| 2014/0245367 A1* | 8/2014 | Sasaki ................ | H04N 21/2343 725/109 |
| 2015/0278988 A1 | 10/2015 | MacMillan et al. | |
| 2017/0006211 A1 | 1/2017 | Gurbuz | |
| 2018/0061011 A1 | 3/2018 | Kim et al. | |
| 2018/0241915 A1 | 8/2018 | Guan et al. | |
| 2019/0266420 A1 | 8/2019 | Ge et al. | |
| 2019/0333187 A1 | 10/2019 | Gubbi Lakshminarasimha et al. | |
| 2020/0023157 A1* | 1/2020 | Lewis ................ | A61B 5/02055 |

FOREIGN PATENT DOCUMENTS

| | | |
|---|---|---|
| JP | 2018-77829 A | 5/2018 |
| KR | 10-2013-0056605 A | 5/2013 |
| KR | 10-2016-0101762 A | 8/2016 |
| KR | 10-2016-0118868 A | 10/2016 |
| KR | 10-1692227 B1 | 1/2017 |
| KR | 10-2018-0072078 A | 6/2018 |
| KR | 10-2018-0101165 A | 9/2018 |
| KR | 10-2020-0025019 A | 3/2020 |

OTHER PUBLICATIONS

Mike Krainin et al., "Seamless Google Street View Panoramas", Google AI Blog, Nov. 9, 2017, pp. 1-7 (7 pages total).

"Create high quality panoramas", PTGui, https://www.ptgui.com/, Nov. 30, 2020, pp. 1-8 (8 pages total).

Kai Chen et al., "Vanishing Point Guided Natural Image Stitching", Journal of Index Class Files, Aug. 2015, vol. 14, No. 8, pp. 1-13 (13 pages total).

David Mack, "Finding shortest paths with Graph Neural Networks", Octavian, Medium, Jan. 8, 2019, https://medium.com/octavian-ai/finding-shortest-paths-with-graph-networks-807c5bbfc9c8, pp. 1-19 (19 pages total).

Nianjin Ye et al., "DeepMeshFlow: Conten Adaptive Mesh Deformation for Robust Image Registration", Dec. 11, 2019, pp. 1-9 (9 pages total).

Eric Arneback, "An Intuitive Explanation of using Poisson Blending for Seamless Copy - and - Paste of Images", https://erkaman.github.io/posts/poisson_blending.html, Nov. 4, 2020, pp. 1-15 (15 pages total).

Huikai Wu et al., "GP-GAN: Towards Realistic High-Resolution Image Blending", ACM, Aug. 5, 2019, pp. 1-11 (11 pages total).

Yingen Xiong et al., "Fast Panorama Stitching on Mobile Devices", Conference in Consumer Electronics, Sep. 13, 2010, pp. 319-320 (2 pages total).

Richard Szeliski, "Image Alignment and Stitching: A Tutorial", NOW, 2006, vol. 2, No. 1, pp. 1-104 (105 pages total).

Charles Herrmann et al., "Robust image stitching with multiple registrations", Computer Vision Foundation, 2018, pp. 1-15 (15 pages total).

"Panoramic Stitcher Tutorials", PhotoStitcher, Nov. 4, 2020, https://www.photostitcher.com/tutorials.html, pp. 1-3 (3 pages total).

* cited by examiner

METHOD AND APPARATUS FOR GENERATING IMAGE

CROSS-REFERENCE TO THE RELATED APPLICATION

This application claims priority from Korean Patent Application No. 10-2020-0106576, filed on Aug. 24, 2020 in the Korean Intellectual Property Office, the disclosure of which is incorporated herein by reference in its entirety.

BACKGROUND

1. Field

Methods and apparatuses consistent with the disclosure relate to image generating technology. More particularly, one or more example embodiments of the disclosure relate to a technique for generating a high-quality wide image by combining teleimages.

2. Description of the Related Art

An electronic device, such as a mobile device, generates a panoramic image using a binning mode. In the binning mode, the electronic device captures images at high speed for high-speed photography. The images captured in the binning mode have many overlaps and low image quality, and as such, the binning mode is inefficient due to the many overlaps. Accordingly, a panoramic image obtained by combining the captured images in the binning mode has low resolution.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of the disclosure, there is provided a method of generating an image, the method comprising: obtaining a wide image of first region; obtaining one or more teleimages of one or more second regions, using a telecamera, the one or more second regions being regions of interest (ROIs) within the first region and the one or more teleimages being obtained according to a capturing order of the telecamera identified for the one or more ROIs based on the wide image; matching the wide image and the one or more teleimages; warping the one or more teleimages to the wide image based on a result of the matching; and stitching the one or more warped teleimages based on the wide image.

The obtaining of the one or more teleimages may comprise identifying the one or more ROIs in the first region based on texture information; and identifying the capturing order for the one or more ROIs; and capturing the one or more teleimages for the one or more ROIs according to the capturing order.

The identifying of the one or more ROIs may comprise identifying as the one or more ROIs, one or more regions within the first region in which a complexity of the texture information is greater than or equal to a threshold, and identifying as a non-ROI, a region within the first region in which the complexity of the texture information is less than the threshold.

The identifying of the capturing order may comprise identifying the capturing order according to a capturing path that takes a minimum time among all combinations of capturing paths of the telecamera for traversing the one or more ROIs.

The identifying of the capturing order may comprise identifying the capturing order based on a capturing path that takes a minimum time for traversing the one or more ROIs using dynamic programming.

The identifying of the capturing order may comprise identifying the capturing order based on a capturing path that takes a minimum time for traversing the one or more ROIs using a deep neural network.

The telecamera may be configured to capture the one or more ROIs according to the capturing order through a translational or rotational motion.

The warping may comprise: calculating a transformation matrix between the wide image and the one or more teleimages based on the result of the matching; and warping the one or more teleimages to the wide image using the transformation matrix.

The warping using the transformation matrix may comprise: upscaling the wide image based on resolutions of the one or more teleimages; and warping the one or more teleimages to the upscaled wide image.

The matching may comprise: adjusting scales or details of the one or more teleimages based on the wide image; and matching the one or more adjusted teleimages and the wide image.

The method may further comprise: identifying that a teleimage, among the one or more teleimages, includes an artifact, and replacing the teleimage with a region of the wide corresponding to the artifact.

The stitching may comprise: adjusting color or brightness of the one or more warped teleimages based on the wide image; and stitching the one or more adjusted teleimages based on the wide image.

The stitching may comprise stitching the one or more warped teleimages respectively corresponding to the one or more ROIs and a portion of the wide image corresponding to a non-ROI.

The stitching may comprise stitching by averaging the one or more warped teleimages.

The stitching may comprise stitching in a weighted mean manner using one or more weights respectively corresponding to the one or more warped teleimages.

The stitching may comprise stitching by seaming the one or more warped teleimages.

According to another aspect of the disclosure, there is provided a non-transitory computer-readable storage medium storing instructions that, when executed by a processor, cause the processor to perform a method of generating an image, the method comprising: obtaining a wide image of first region; obtaining one or more teleimages of one or more second regions, using a telecamera, the one or more second regions being regions of interest (ROIs) within the first region and the one or more teleimages being obtained according to a capturing order of the telecamera identified for the one or more ROIs based on the wide image; matching the wide image and the one or more teleimages; warping the one or more teleimages to the wide image based on a result of the matching; and stitching the one or more warped teleimages based on the wide image.

According to another aspect of the disclosure, there is provided an apparatus for generating an image, the apparatus comprising: a memory storing one or more instructions; at least one processor configured to execute the one or more instructions to: obtain a wide image of a first region, identify a capturing order of a telecamera for one or more second regions within the first region, the one or more second regions being regions of interest (ROIs) within the first region, match the wide image and one or more teleimages captured by the telecamera, warp the one or more teleimages to the wide image based on a result of the matching, and stitch the one or more warped teleimages based on the wide image.

The processor may be further configured to identify the one or more ROIs in the first region based on texture information of the wide image.

According to another aspect of the disclosure, there is provided a terminal, comprising: a wide camera; a telecamera; a memory storing one or more instructions; at least one processor configured to execute the one or more instructions to: obtain a wide image of first region captured by the wide camera; identify a capturing order of the telecamera for one or more second regions within the first region, the one or more second regions being regions of interest (ROIs) within the first region, match the wide image and one or more teleimages captured by the telecamera, warp the one or more teleimages to the wide image based on a result of the matching, and stitch the one or more warped teleimages based on the wide image.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
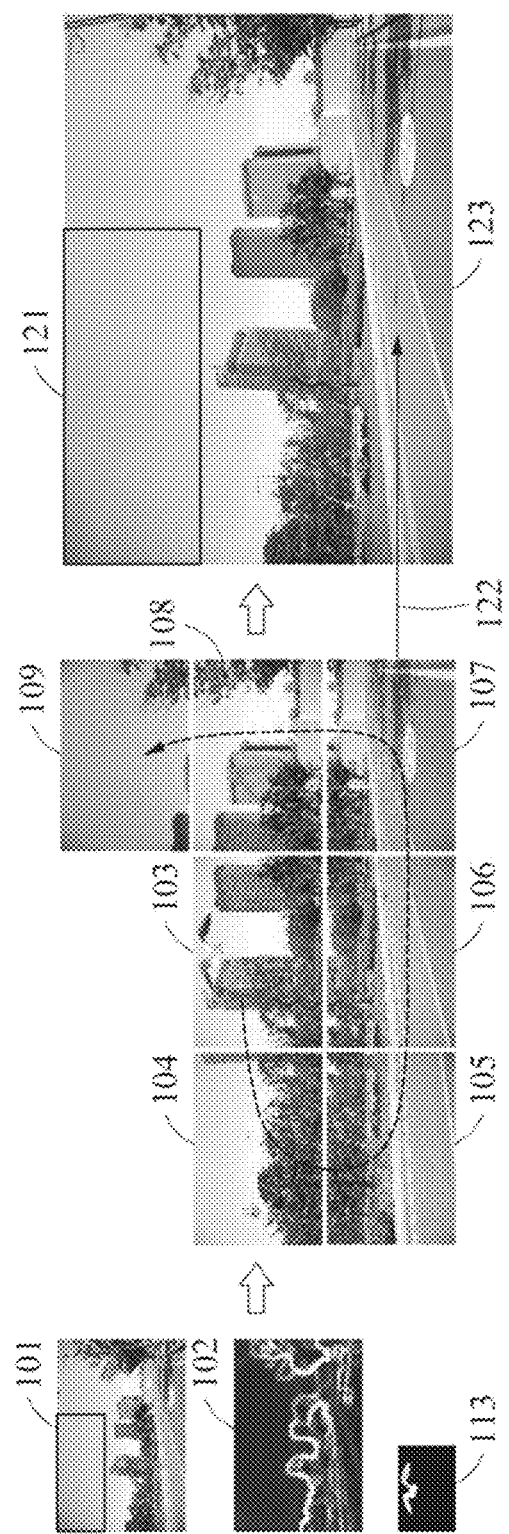
FIG. 1 illustrates a process of generating a high-quality wide image by an image generating apparatus according to an example embodiment.

Hereinafter, example embodiments will be described in detail with reference to the accompanying drawings. However, various alterations and modifications may be made to the example embodiments. Here, the example embodiments are not construed as limited to the disclosure. The example embodiments should be understood to include all changes, equivalents, and replacements within the idea and the technical scope of the disclosure.

The terminology used herein is for the purpose of describing particular example embodiments only and is not to be limiting of the example embodiments. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 illustrates a process of generating a high-quality wide image by an image generating apparatus according to an example embodiment.

According to an example embodiment, an image generating apparatus may capture high-quality teleimages based on a low-quality wide image and generate a high-quality image by combining the teleimages. The image generating apparatus may efficiently generate a high-resolution image having a wide field of view (FOV) by using a wide camera and a moving telecamera. According to an example embodiment, the wide camera may have a wide angle lens and the telecamera may have a telephoto lens. Here, the telecamera may perform, for example, translational motions in x-axial, y-axial, and z-axial directions and rotational motions in three axial directions of roll, pitch, and yaw. The image generating apparatus may set an optimal path for capturing teleimages by using the telecamera having various degrees of freedom.

The image generating apparatus may stitch the teleimages and the wide image by referring to context information of the wide image. Through this, an image having the FOV of the wide image and the resolution of the teleimages may be generated. The high-resolution image may be referred to as a tele-wide giga pixel image.

To this end, the image generating apparatus may analyze the context of the wide image and set regions of interest (ROIs). The context of the wide image may include a texture, an edge, a detail, or an objectness, but is not limited thereto.

The image generating apparatus may analyze one or more ROIs and set the optimal capturing path of the telecamera. The image generating apparatus may calculate the optimal capturing path by analyzing the ROIs and basic information of the telecamera. For example, the basic information of the telecamera may include a speed of movement of the telecamera, but is not limited thereto.

For example, the image generating apparatus may determine the optimal capturing path using graph-based method. For example, the graph based method may be node and edge-based dynamic programming, based on information for each grid in a screen. As another example, the image generating apparatus may train a neural network using training data and determine the optimal capturing path using the neural network.

The image generating apparatus may capture a target with the telecamera along the determined capturing path. The image generating apparatus may capture the target along the capturing path by changing the orientation of the telecamera to the x-axis or y-axis.

The image generating apparatus may match the teleimages and the wide image based on the context of the wide image. The image generating apparatus may adjust the level of details or scales of the wide image and the teleimages for the same ROIs. The image generating apparatus may match the wide image and the teleimages based on feature points or interest points of the wide image and the teleimages after the adjustment. The feature points may be found through the neural network trained in advance.

The image generating apparatus may calculate a transformation matrix of the teleimages and the wide image based on the matching relationship. The image generating apparatus may transform the teleimages into coordinates in the wide image using the transformation matrix. This coordinate transformation may be referred to as warping. The wide image may be upscaled in consideration of the resolution of the teleimages.

The image generating apparatus may adjust color or brightness of the warped teleimages. The image generating apparatus may stitch the adjusted teleimages based on the wide image. The image generating apparatus may stitch the adjusted teleimages corresponding to the ROIs and the wide image corresponding to a non-ROI.

According to an example embodiment, the image generating apparatus may increase the resolution of the wide image for a region with a relatively low resolution. The image generating apparatus may increase the resolution of the wide image by using a super-resolution deep neural network or deblurring.

The time at which the wide image is captured may differ from the time at which the one or more teleimages are captured, and a dynamic object may be captured at a particular time. The dynamic object captured in a portion of the teleimages may be referred to as an artifact or ghost artifact. An artifact is a region to be excluded from a resulting image, and the image generating apparatus may remove the artifact through the wide image.

The image generating apparatus may obtain a mask region by comparing the warped teleimages and the upscaled wide image, and synthesize a resulting image by replacing a portion corresponding to the mask region with the wide image. The image generating apparatus may obtain the mask region for a region occupied by the artifact by comparing the wide image and the teleimages. The image generating apparatus may fetch the portion corresponding to the mask region from the wide image.

The image generating apparatus may stitch the teleimages in various manners. For example, the image generating apparatus may stitch the teleimages in a seaming manner. The image generating apparatus may determine a boundary of each teleimage at an overlapping portion between the teleimages and combine the teleimages. As another example, the image generating apparatus may stitch the teleimages in a blending manner. The image generating apparatus may stitch the teleimages by averaging boundaries of teleimages adjacent to each other. As another example, the image generating apparatus may stitch the teleimages by weighted averaging pixel values of teleimages adjacent to each other.

The image generating apparatus sets the capturing path for the teleimages based on the wide image and thus, may generate a high-quality image using a small number of teleimages by minimizing the overlap of captured regions between the teleimages. The image generating apparatus captures still cuts in a capture mode and thus, may obtain relatively high-resolution teleimages compared to a binning mode or a video mode and consequently obtain a wide-FOV and high-resolution image.

The image generating apparatus stitches the teleimages with reference to the wide image and thus, may minimize an issue of distortion in the combined image. The image generating apparatus uses the wide image as well as the teleimages for stitching and thus, may remove an artifact. The image generating apparatus fetches a wide image for a region with low texture complexity and thus, may minimize the cost for capturing and stitching teleimages.

Referring to FIG. 1, the image generating apparatus may obtain a wide image 101. The image generating apparatus may directly capture the wide image 101 using a wide camera or receive the already captured wide image 101 using a communication module or a communication interface. According to an example embodiment, the communication module may be implemented by a communication circuit.

The image generating apparatus may set ROIs using texture information 102 of the wide image 101. For example, the wide image 101 may be divided into nine regions, and the complexity of the texture information 102 may be relatively low in two regions at the upper left. The image generating apparatus may set the remaining seven regions excluding these two regions as the ROIs.

The image generating apparatus may set a capturing path for the seven regions so as to minimize a capturing time. For example, the image generating apparatus may set the capturing path in the order of the region 103, the region 104, the region 105, the region 106, the region 107, the region 108, and the region 109. The image generating apparatus may obtain the plurality of teleimages by moving the telecamera according to the determined capturing path.

For example, the teleimage of the region 103 may include an artifact. When compared to the wide image 101, the teleimage of the region 103 may include a seagull. The image generating apparatus may generate a mask region 113 for the region occupied by the seagull. The image generating apparatus may fetch pixel information corresponding to the mask region 113 from the wide image 101.

The image generating apparatus may fetch a portion corresponding to a non-ROI 121 with low texture complexity from the wide image 101. The image generating apparatus may generate a resulting image 123 by stitching the portion corresponding to the non-ROI 121 from the wide image 101 and the teleimages corresponding to the ROIs 103, 104, 105, 106, 107, 108, and 109. The resulting image 123 may have a higher resolution than the wide image 101.

Figure 2:
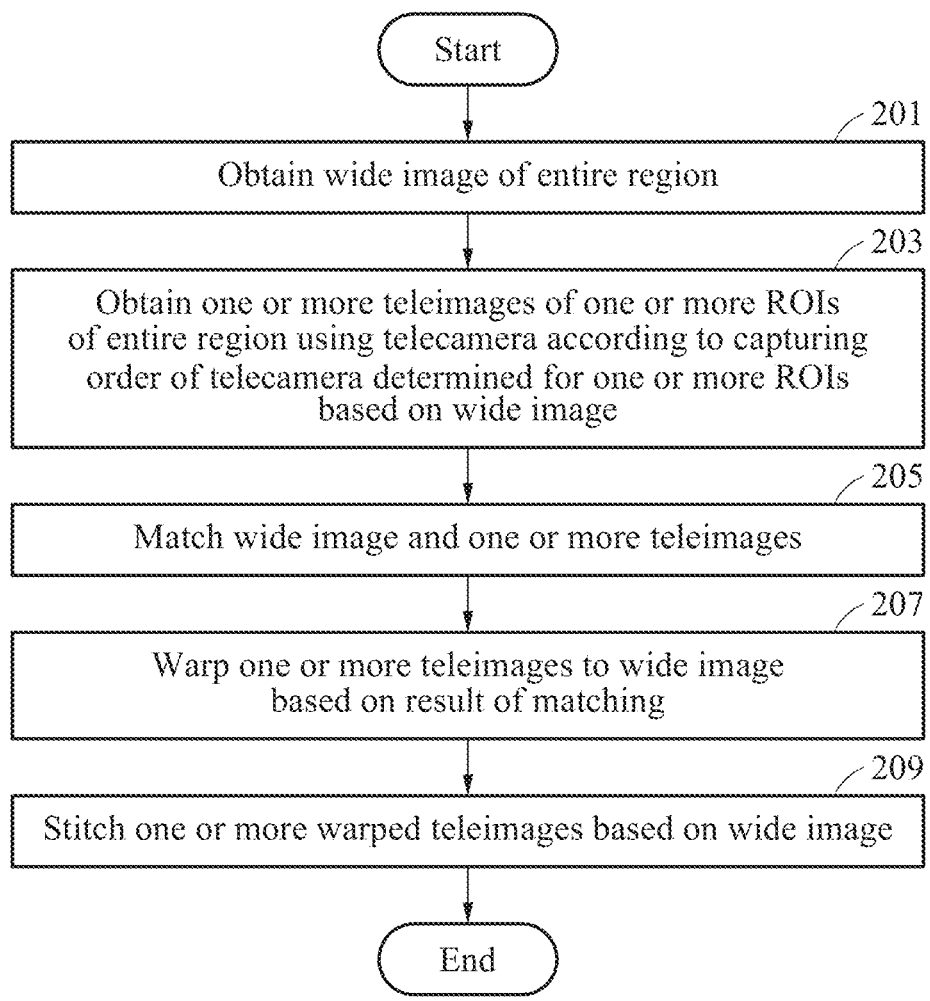
FIG. 2 is a flowchart illustrating an image generating method according to an example embodiment.

FIG. 2 is a flowchart illustrating an image generating method according to an example embodiment.

Referring to FIG. 2, in operation 201, an image generating apparatus may obtain a wide image of an entire region.

In operation 203, the image generating apparatus may obtain one or more teleimages for one or more ROIs of the entire region based on the wide image. The image generating apparatus may determine the one or more ROIs in the entire region based on texture information. The image generating apparatus may determine a capturing order for the one or more ROIs. The image generating apparatus may capture the one or more teleimages for the one or more ROIs according to the capturing order.

In operation 205, the image generating apparatus may match the wide image and the one or more teleimages. The image generating apparatus may adjust scales or details of the one or more teleimages based on the wide image. The image generating apparatus may match the adjusted teleimages and the wide image.

In operation 207, the image generating apparatus may warp the one or more teleimages to the wide image based on a result of the matching. The image generating apparatus may calculate a transformation matrix between the wide image and the teleimages based on a result of the matching. The image generating apparatus may warp the one or more teleimages to the wide image using the transformation matrix.

The image generating apparatus may upscale the wide image based on the resolution of the teleimages. The image generating apparatus may warp the one or more teleimages to the upscaled wide image.

In operation 209, the image generating apparatus may stitch the one or more warped teleimages based on the wide image. The image generating apparatus may adjust colors or brightnesses of the one or more warped teleimages based on the wide image. The image generating apparatus may stitch the one or more adjusted teleimages based on the wide image.

According to an example embodiment, the image generating apparatus may perform stitching by averaging the one or more warped teleimages. According to another example embodiment, the image generating apparatus may perform stitching in a weighted average manner using one or more weights respectively corresponding to the one or more warped teleimages. According to still another example embodiment, the image generating apparatus may perform stitching by seaming the one or more warped teleimages.

Figure 3:
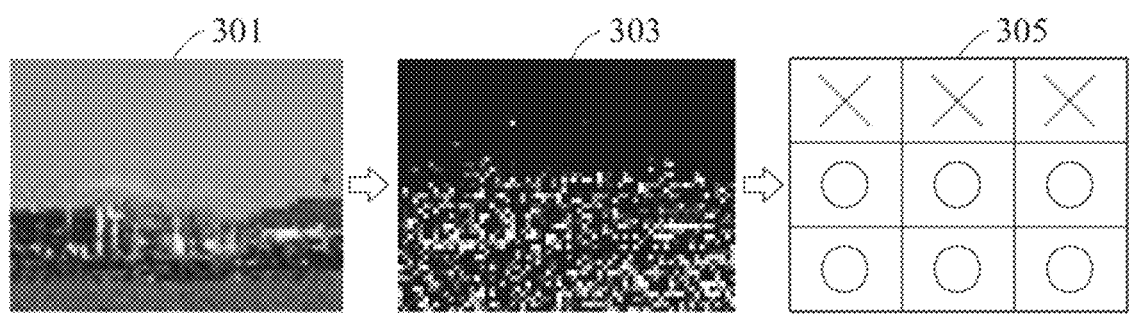
FIG. 3 illustrates a process of determining regions of interest (ROIs) by an image generating apparatus according to an example embodiment.

FIG. 3 illustrates a process of determining regions of interest (ROIs) by an image generating apparatus according to an example embodiment.

The image generating apparatus may determine one or more ROIs in an entire region based on texture information. The image generating apparatus may determine one or more regions in which a complexity of the texture information is greater than or equal to a threshold to be the one or more ROIs. The image generating apparatus may set regions in which the complexity of the texture information is less than the threshold to be non-ROIs.

Referring to FIG. 3, the image generating apparatus may obtain texture information 303 from a wide image 301. The image generating apparatus may evaluate the complexity of the texture information 303 for each region. The image generating apparatus may set three regions at the top side in which the complexity is less than a threshold as non-ROIs, and set six regions at the lower side in which the complexity is greater than or equal to the threshold as ROIs. A table 305 shows a result of displaying the ROIs and the non-ROIs.

Figure 4:
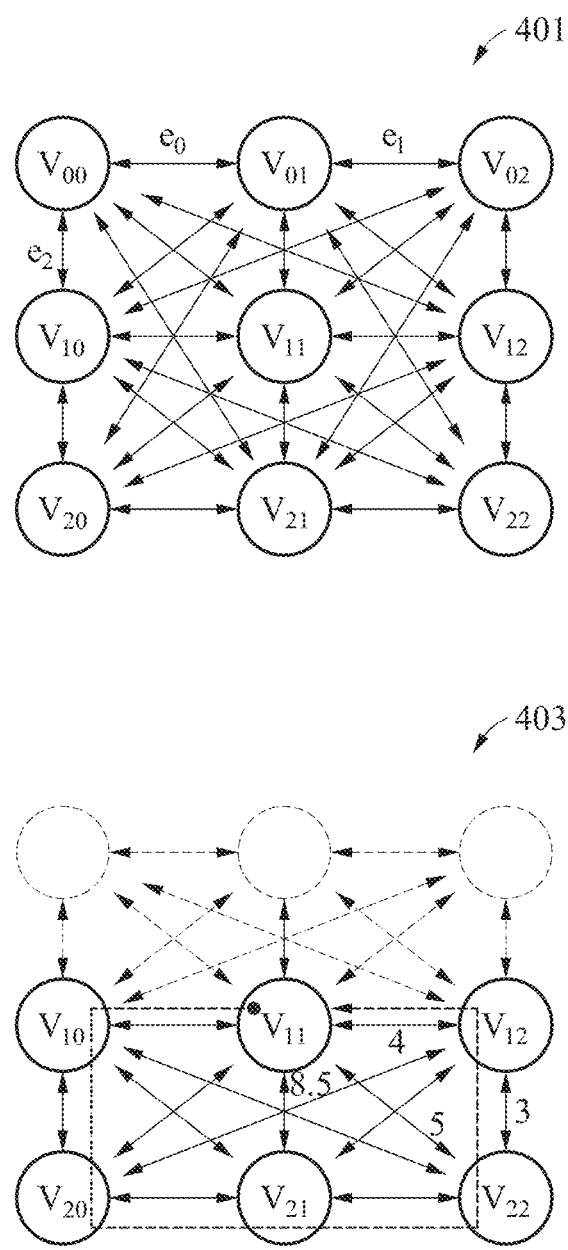
FIG. 4 illustrates a process of determining a capturing order for ROIs by an image generating apparatus according to an example embodiment.

FIG. 4 illustrates a process of determining a capturing order for ROIs by an image generating apparatus according to an example embodiment.

An image generating apparatus may determine a capturing order for one or more ROIs. According to an example embodiment, the image generating apparatus may determine the capturing order according to a capturing path that takes a minimum time among all combinations of capturing paths of a telecamera for the one or more ROIs. According to another example embodiment, the image generating apparatus may determine the capturing order according to a capturing path that takes a minimum time using dynamic programming. According to still another example embodiment, the image generating apparatus may determine the capturing order according to a capturing path that takes a minimum time using a deep neural network.

Referring to FIG. 4, the image generating apparatus may determine an optimal capturing path using graph-based, for example, node and edge-based dynamic programming, based on information for each grid in a screen. A graph 401 shows 9 divided regions as nodes, where nodes are connected by a moving path as an edge. An edge between nodes corresponds to a moving time of the telecamera.

In a graph 403, nodes corresponding to non-ROIs are by broken lines. Nodes corresponding to ROIs are indicated by solid lines. The image generating apparatus may determine a path that minimizes the movement time between nodes. According to the graph 403, the capturing path may be determined to be a counterclockwise direction starting from the node at the center.

Figure 5:
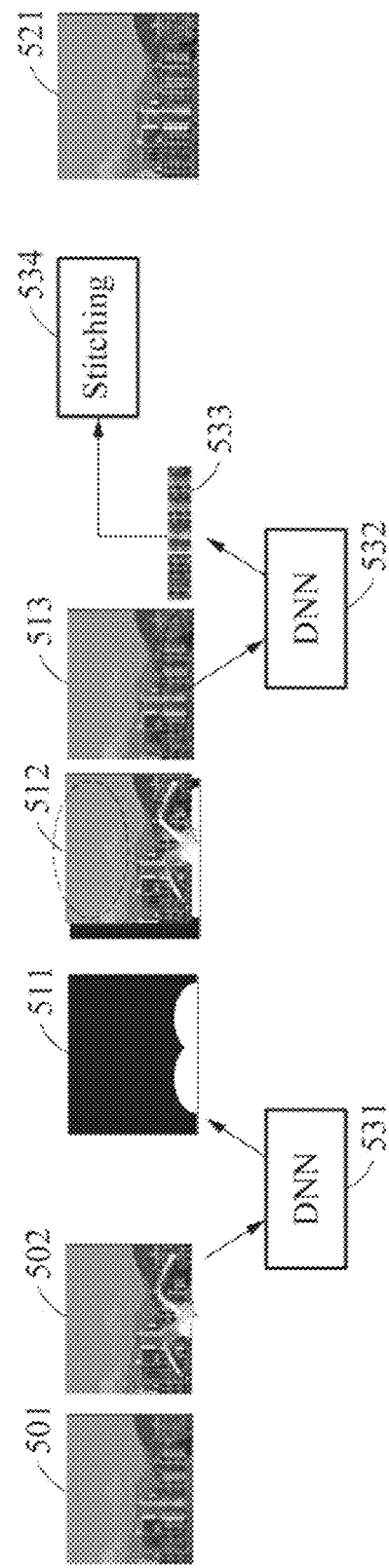
FIG. 5 illustrates a process of processing an artifact by an image generating apparatus according to an example embodiment.

FIG. 5 illustrates a process of processing an artifact by an image generating apparatus according to an example embodiment.

According to an example embodiment, if a teleimage includes an artifact, an image generating apparatus may replace the teleimage with a wide image for a region occupied by the artifact.

Referring to FIG. 5, a teleimage 502 may include, in a particular region, a seagull that is not observed in a wide image 501. The image generating apparatus may generate an image 511 showing a mask region for the artifact region of the teleimage 502 using a deep neural network (DNN) 531.

The image generating apparatus may refer to a wide image 513 for the mask region in the teleimage 512 and refer to the teleimage 512 for a region other than the mask region. The image generating apparatus may increase the resolution of the referred region of the wide image 513 by using the DNN 532. The image generating apparatus may generate a resulting image 521 by stitching a resolution-improved image 533 and the referred region of the teleimage 512 in operation 534.

Figure 6:
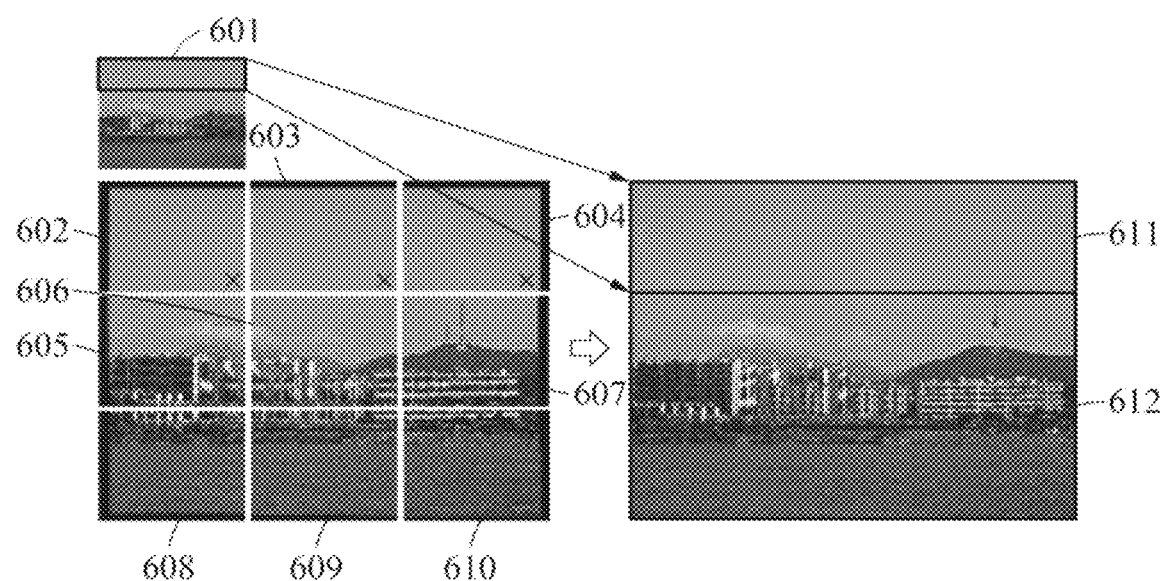
FIG. 6 illustrates a process of stitching a wide image corresponding to non-ROIs and teleimages corresponding to ROIs by an image generating apparatus according to an example embodiment.

FIG. 6 illustrates a process of stitching a wide image corresponding to non-ROIs and teleimages corresponding to ROIs by an image generating apparatus according to an example embodiment.

An image generating apparatus may stitch one or more warped teleimages based on a wide image. The image generating apparatus may stitch the one or more warped teleimages respectively corresponding to one or more ROIs and the wide image corresponding to non-ROIs.

Referring to FIG. 6, the image generating apparatus may generate a resolution-improved image 611 by upscaling portions corresponding to non-ROIs 602, 603, and 604 in a wide image 601. The image generating apparatus may stitch the image 611 and teleimages 605, 606, 607, 608, 609, and 610 corresponding to the ROIs. The image generating apparatus may generate a high-resolution resulting image 612.

Figure 7:
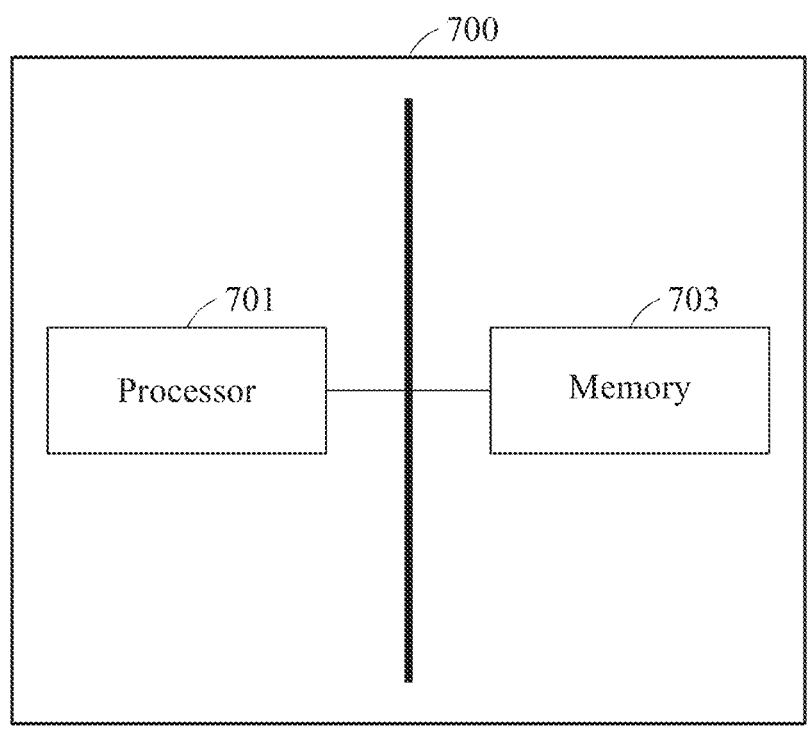
FIG. 7 is a block diagram illustrating a configuration of an image generating apparatus according to an example embodiment.

FIG. 7 is a block diagram illustrating a configuration of an image generating apparatus according to an example embodiment.

Referring to FIG. 7, an image generating apparatus 700 includes at least one processor 701 and a memory 703. The processor 701 may obtain a wide image of an entire region.

According to an example embodiment, a wide camera obtains one or more teleimages for one or more ROIs in the entire region based on the wide image. The processor 701 may determine the one or more ROIs in the entire region based on texture information. The processor 701 may determine a capturing order for the one or more ROIs. The processor 701 may capture the one or more teleimages for the one or more ROIs according to the capturing order.

The processor 701 matches the wide image and the one or more teleimages. The processor 701 warps the one or more teleimages to the wide image based on a result of the matching. The processor 701 stitches the one or more warped teleimages based on the wide image. If there is a teleimage including an artifact, the processor 701 may replace the teleimage with the wide image for a region occupied by the artifact. The processor 701 may stitch the one or more warped teleimages respectively corresponding to the one or more ROIs and the wide image corresponding to a non-ROI.

Figure 8:
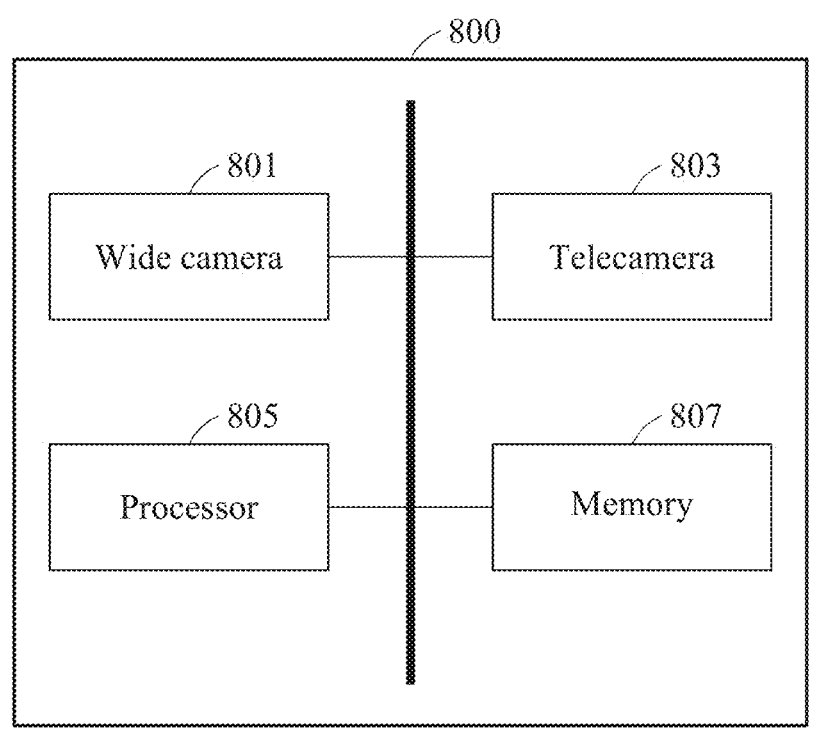
FIG. 8 is a block diagram illustrating a configuration of a terminal according to an example embodiment.

FIG. 8 is a block diagram illustrating a configuration of a terminal according to an example embodiment.

Referring to FIG. 8, a terminal 800 includes a wide camera 801, a telecamera 803, at least one processor 805, and a memory 807. The wide camera 801 captures a wide image of an entire region. According to an example embodiment, the wide camera 801 may have a wide angle lens and the telecamera may have a telephoto lens.

The processor 805 obtains one or more teleimages for one or more ROIs in the entire region using the telecamera 803 based on the wide image. The processor 805 matches the wide image and the one or more teleimages. The processor 805 warps the one or more teleimages to the wide image based on a result of the matching. The processor 805 stitches the one or more warped teleimages based on the wide image.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A method of generating an image, the method comprising:
    obtaining a wide image of first region;
    obtaining one or more teleimages of one or more second regions, using a telecamera, the one or more second regions being regions of interest (ROIs) within the first region and the one or more teleimages being obtained according to a capturing order of the telecamera identified for the one or more ROIs based on the wide image;
    matching the wide image and the one or more teleimages;
    warping the one or more teleimages to the wide image based on a result of the matching; and
    stitching the one or more warped teleimages based on the wide image.

2. The method of claim 1, wherein the obtaining of the one or more teleimages comprises:
    identifying the one or more ROIs in the first region based on texture information; and
    identifying the capturing order for the one or more ROIs; and
    capturing the one or more teleimages for the one or more ROIs according to the capturing order.

3. The method of claim 2, wherein the identifying of the one or more ROIs comprises identifying as the one or more ROIs, one or more regions within the first region in which a complexity of the texture information is greater than or equal to a threshold, and identifying as a non-ROI, a region within the first region in which the complexity of the texture information is less than the threshold.

4. The method of claim 2, wherein the identifying of the capturing order comprises identifying the capturing order according to a capturing path that takes a minimum time among all combinations of capturing paths of the telecamera for traversing the one or more ROIs.

5. The method of claim 2, wherein the identifying of the capturing order comprises identifying the capturing order based on a capturing path that takes a minimum time for traversing the one or more ROIs using dynamic programming.

6. The method of claim 2, wherein the identifying of the capturing order comprises identifying the capturing order based on a capturing path that takes a minimum time for traversing the one or more ROIs using a deep neural network.

7. The method of claim 2, wherein the telecamera is configured to capture the one or more ROIs according to the capturing order through a translational or rotational motion.

8. The method of claim 1, wherein the warping comprises:
calculating a transformation matrix between the wide image and the one or more teleimages based on the result of the matching; and
warping the one or more teleimages to the wide image using the transformation matrix.

9. The method of claim 1, wherein the warping using the transformation matrix comprises:
upscaling the wide image based on resolutions of the one or more teleimages; and
warping the one or more teleimages to the upscaled wide image.

10. The method of claim 1, wherein the matching comprises:
adjusting scales or details of the one or more teleimages based on the wide image; and
matching the one or more adjusted teleimages and the wide image.

11. The method of claim 1, further comprising:
identifying that a teleimage, among the one or more teleimages, includes an artifact, and
replacing the teleimage with a region of the wide corresponding to the artifact.

12. The method of claim 1, wherein the stitching comprises:
adjusting color or brightness of the one or more warped teleimages based on the wide image; and
stitching the one or more adjusted teleimages based on the wide image.

13. The method of claim 1, wherein the stitching comprises stitching the one or more warped teleimages respectively corresponding to the one or more ROIs and a portion of the wide image corresponding to a non-ROI.

14. The method of claim 1, wherein the stitching comprises stitching by averaging the one or more warped teleimages.

15. The method of claim 1, wherein the stitching comprises stitching in a weighted mean manner using one or more weights respectively corresponding to the one or more warped teleimages.

16. The method of claim 1, wherein the stitching comprises stitching by seaming the one or more warped teleimages.

17. A non-transitory computer-readable storage medium storing instructions that, when executed by a processor, cause the processor to perform the method of claim 1.

18. An apparatus for generating an image, the apparatus comprising:
a memory storing one or more instructions;
at least one processor configured to execute the one or more instructions to:
obtain a wide image of a first region,
identify a capturing order of a telecamera for one or more second regions within the first region, the one or more second regions being regions of interest (ROIs) within the first region,
match the wide image and one or more teleimages captured by the telecamera,
warp the one or more teleimages to the wide image based on a result of the matching, and
stitch the one or more warped teleimages based on the wide image.

19. The apparatus of claim 18, wherein the processor is further configured to identify the one or more ROIs in the first region based on texture information of the wide image.

20. A terminal, comprising:
a wide camera;
a telecamera;
a memory storing one or more instructions;
at least one processor configured to execute the one or more instructions to:
obtain a wide image of first region captured by the wide camera;
identify a capturing order of the telecamera for one or more second regions within the first region, the one or more second regions being regions of interest (ROIs) within the first region,
match the wide image and one or more teleimages captured by the telecamera,
warp the one or more teleimages to the wide image based on a result of the matching, and
stitch the one or more warped teleimages based on the wide image.

* * * * *